(12) United States Patent
Yanase et al.

(10) Patent No.: US 7,720,913 B2
(45) Date of Patent: May 18, 2010

(54) ELECTRONIC MUSICAL APPARATUS AND SERVER COMPUTER

(75) Inventors: Tsutomu Yanase, Hamamatsu (JP);
Satoru Umezawa, Kakegawa (JP);
Takeo Shibukawa, Iwata (JP)

(73) Assignee: Yamaha Corporation, Hamamatsu-shi (JP)

( * ) Notice: Subject to any disclaimer, the term of this patent is extended or adjusted under 35 U.S.C. 154(b) by 1491 days.

(21) Appl. No.: 11/013,970

(22) Filed: Dec. 15, 2004

(65) Prior Publication Data

US 2005/0251559 A1 Nov. 10, 2005

(30) Foreign Application Priority Data

Dec. 22, 2003 (JP) ............................. 2003-424634

(51) Int. Cl.
*G06F 15/16* (2006.01)
*G06F 15/173* (2006.01)
*G04B 13/00* (2006.01)

(52) U.S. Cl. ......................... 709/206; 709/225; 84/600; 84/609

(58) Field of Classification Search ........................ None
See application file for complete search history.

(56) References Cited

U.S. PATENT DOCUMENTS

| | | | |
|---|---|---|---|
| 6,510,438 B2 | 1/2003 | Hasegawa | |
| 7,020,635 B2* | 3/2006 | Hamilton et al. | 705/51 |
| 7,130,742 B2* | 10/2006 | Kobuya et al. | 701/207 |
| 7,490,136 B2* | 2/2009 | Suzuki | 709/217 |
| 2002/0065880 A1* | 5/2002 | Hasegawa et al. | 709/203 |
| 2003/0056637 A1* | 3/2003 | Hasegawa | 84/609 |
| 2003/0135563 A1* | 7/2003 | Bodin et al. | 709/206 |

FOREIGN PATENT DOCUMENTS

| | | |
|---|---|---|
| JP | 11-203217 | 7/1999 |
| JP | 2002-183039 | 6/2002 |
| JP | 2002-207653 | 7/2002 |
| JP | 2003-099627 | 4/2003 |

OTHER PUBLICATIONS

"ChaBo" Hybrid notice board by Kemokemo (Yoichi Sato), see Internet http://www.kemokemo.com/cgilabo/chabo.

* cited by examiner

*Primary Examiner*—Wen-Tai Lin
(74) *Attorney, Agent, or Firm*—Morrison & Foerster LLP

(57) ABSTRACT

An electronic musical apparatus M1 transmits apparatus ID information and a common mail page access signal to a server computer SC. The server computer SC receives the signal and apparatus ID information. On the basis of the apparatus ID information, the server computer SC searches a user database 206a to identify the mail box of the user of the electronic musical apparatus M1. The server computer SC also searches an e-mail database 206b to retrieve an e-mail message stored in the identified mail box. The retrieved e-mail message is adjusted in accordance with display capabilities of a display unit 13 of the electronic musical apparatus M1. The server computer SC then transmits the retrieved e-mail message to the electronic musical apparatus M1. The user of the electronic musical apparatus M1 is allowed to easily read e-mail messages on the display unit 13.

12 Claims, 11 Drawing Sheets

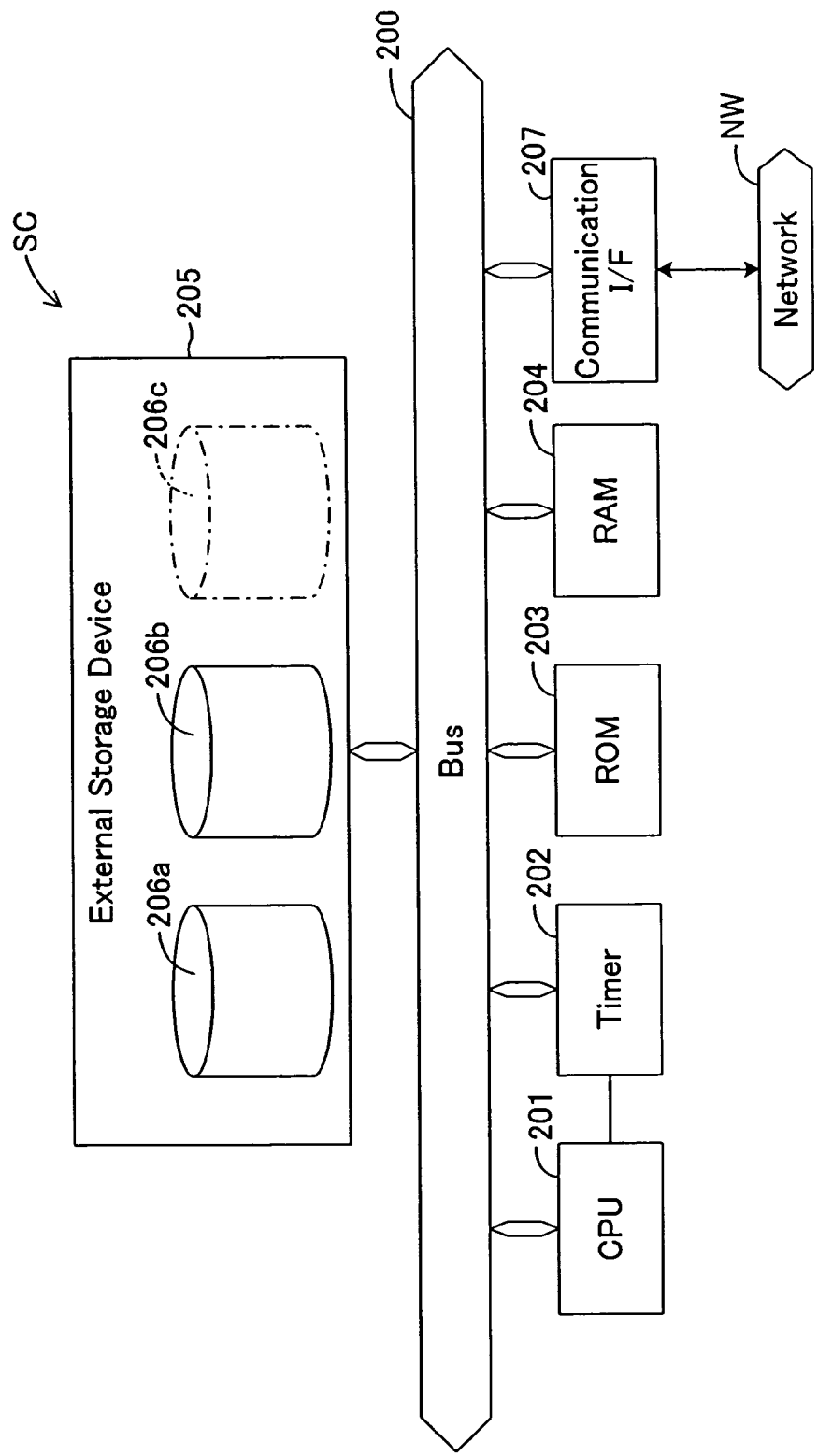

ELECTRONIC MUSICAL APPARATUS AND SERVER COMPUTER

BACKGROUND OF THE INVENTION

1. Field of the Invention

The present invention relates to an electronic musical apparatus which retrieves various information from a server computer with which the electronic musical apparatus can communicate.

2. Description of the Related Art

As disclosed in JP2002-183039A, for example, a page generating method for electronic bulletin board has been known. In this page generating method for electronic bulletin board, on a page in which a posted article is displayed there are displayed a display part where a specified posted article is displayed and a hierarchical list display part. In this page generating method, furthermore, a user specifies a posted article page which he/she desires to view, and accesses the specified page.

In addition, as disclosed in JP11-203217A, for example, an e-mail transmission and reception method has been known. This method is designed such that when an e-mail message to which music data formed of MIDI data is attached is received, character data and a reproduction button for reproducing the music data are displayed on a display unit. Furthermore, this method is designed such that a user inputs his/her e-mail account to transmit/receive e-mail messages.

In the above-described conventional page generating method for electronic bulletin board and e-mail transmission and reception method, a user retrieves information by specifying where the information is to be delivered. However, computer apparatuses that users use today vary widely, and some computer apparatuses are not even provided with inputting means such as a keyboard and mouse. Such computer apparatuses include electronic musical apparatuses that can communicate with the outside (a server computer). When these electronic musical apparatuses are used to access an electronic bulletin board or retrieve e-mail messages, users of these electronic musical apparatuses have difficulty in some cases in specifying where information is to be delivered. Therefore, it is desirable to reduce the amount of information that users input to a computer apparatus so that the users can easily retrieve various information.

SUMMARY OF THE INVENTION

The present invention was accomplished to solve the above-described problem, and an object thereof is to provide an electronic musical apparatus, server computer and a program applied thereto which reduce the amount of information that users are required to input and allow the users to easily retrieve various information.

In order to achieve the above-described object, a feature of the present invention lies in a server computer which is connected to a network and delivers an e-mail message to an external terminal apparatus connected to the network, the server computer comprising a first database storing identification information for identifying the external terminal apparatus and user information for identifying a user of the external terminal apparatus with associated relation established between the identification information and the user information; a second database storing an e-mail message of the user of the external terminal apparatus identified on the basis of the user information; a receiving portion for receiving identification information from the external terminal apparatus; a user identifying portion for searching the first database on the basis of the identification information received by the receiving portion and identifying the user of the external terminal apparatus; an e-mail message extracting portion for searching the second database on the basis of the user identified by the user identifying portion and extracting an e-mail message to be delivered to the external terminal apparatus; and an e-mail message delivering portion for delivering the e-mail message extracted by the e-mail message extracting portion to the external terminal apparatus. This constitution may be adapted such that the server computer further comprises a determining portion for determining whether the server computer has received the identification information from the external terminal apparatus; a requesting portion for issuing a request for the user information to the external terminal apparatus; and a second receiving portion for receiving the user information from the external terminal apparatus; whereby when the determining portion determines that the identification information has not been received, the requesting portion issues a request for the user information to the external terminal apparatus, and on the basis of the user information received by the second receiving portion, the e-mail message extracting portion searches the second database and extracts an e-mail message to be delivered to the external terminal apparatus.

Another feature of the present invention lies in a server computer which is connected to a network and delivers electronic bulletin board information stored in an electronic bulletin board to an external terminal apparatus connected to the network, the server computer comprising a first database storing identification information for identifying the external terminal apparatus and model information for identifying a model of the external terminal apparatus with associated relation established between the identification information and the model information; a second database storing electronic bulletin board information being constituted by a plurality of categories associated with the model of the external terminal apparatus identified by use of the model information; a receiving portion for receiving identification information from the external terminal apparatus; a model identifying portion for searching the first database on the basis of the identification information received by the receiving portion and identifying a model of the external terminal apparatus; an information extracting portion extracting from the second database, on the basis of the model identified by the model identifying portion, electronic bulletin board information of a category associated with the identified model; and an information delivering portion for delivering the electronic bulletin board information extracted by the information extracting portion to the external terminal apparatus. This constitution may be adapted such that the server computer further comprises a determining portion for determining whether the server computer has received the identification information from the external terminal apparatus; a requesting portion for issuing a request for the model information or category information for identifying a category of an electronic bulletin board to the external terminal apparatus; and a second receiving portion for receiving the model information or the category information from the external terminal apparatus; whereby when the determining portion determines that the identification information has not been received, the requesting portion issues a request for the model information or the category information to the external terminal apparatus, and on the basis of the model information or the category information received by the second receiving portion, the information extracting portion extracts electronic bulletin board information to be delivered to the external terminal apparatus from the second database.

The above-described constitution enables the server computer to receive, from the external terminal apparatus (e.g., an electronic musical apparatus), identification information (ID) of the terminal apparatus to deliver an e-mail message for the user of the external terminal apparatus and electronic bulletin board information of a category associated with the model of the terminal apparatus. As a result, the user of the external terminal apparatus is capable of retrieving e-mail messages and electronic bulletin board information without entering his/her user name and password, for example. Even with an external terminal apparatus without input means (e.g., keyboard and mouse), therefore, the user can easily retrieve e-mail messages and electronic bulletin board information. When the server computer has not received identification information from an external terminal apparatus, furthermore, the server computer issues a request for user information, model information or category information to the terminal apparatus. Therefore, this constitution is preferable in that, even in a case where the external terminal apparatus is a general-purpose terminal (e.g., a PDA, personal computer, etc.), the external terminal apparatus can access the server computer to retrieve e-mail information and electronic bulletin board information. On a general-purpose terminal, the user can enter information required by the server computer without any trouble since the general-purpose terminal is provided with adequate input means.

Still another feature of the present invention lies in an electronic musical apparatus which generates a musical tone signal and communicates with an external server computer to retrieve e-mail information or electronic bulletin board information stored in an electronic bulletin board, the electronic musical apparatus comprising a display portion for legibly displaying musical tone control information for controlling the generation of the musical tone signal and the e-mail information or electronic bulletin board information; a storing portion for storing identification information for identifying the electronic musical apparatus; a connecting and transmitting portion for connecting to the external server computer, and transmitting the identification information stored in the storing portion to the external server computer; and a receiving portion for receiving, from the external server computer, e-mail information associated with a user or electronic bulletin board information of a category associated with the model of the electronic musical apparatus.

The above-described constitution enables the electronic musical apparatus to retrieve e-mail messages and electronic bulletin board information of a category associated with the electronic musical apparatus by automatically transmitting identification information (ID) of the electronic musical apparatus on the connection with the external server computer provided on the Web. As a result, the user can retrieve e-mail messages and electronic bulletin board information without entering his/her user name and password, for example. Even with an electronic musical apparatus without separate input means (e.g., keyboard and mouse), therefore, the user can easily retrieve information.

A further feature of the present invention lies in a computer-readable program that is applied to electronic musical apparatuses and server computers similar to the above and realizes functions described above.

BRIEF DESCRIPTION OF THE DRAWINGS

FIG. 4 is a schematic block diagram of the server computer according to the first and second embodiment of the present invention shown in FIG. 1;

DESCRIPTION OF THE PREFERRED EMBODIMENT

1. First Embodiment

Figure 1:
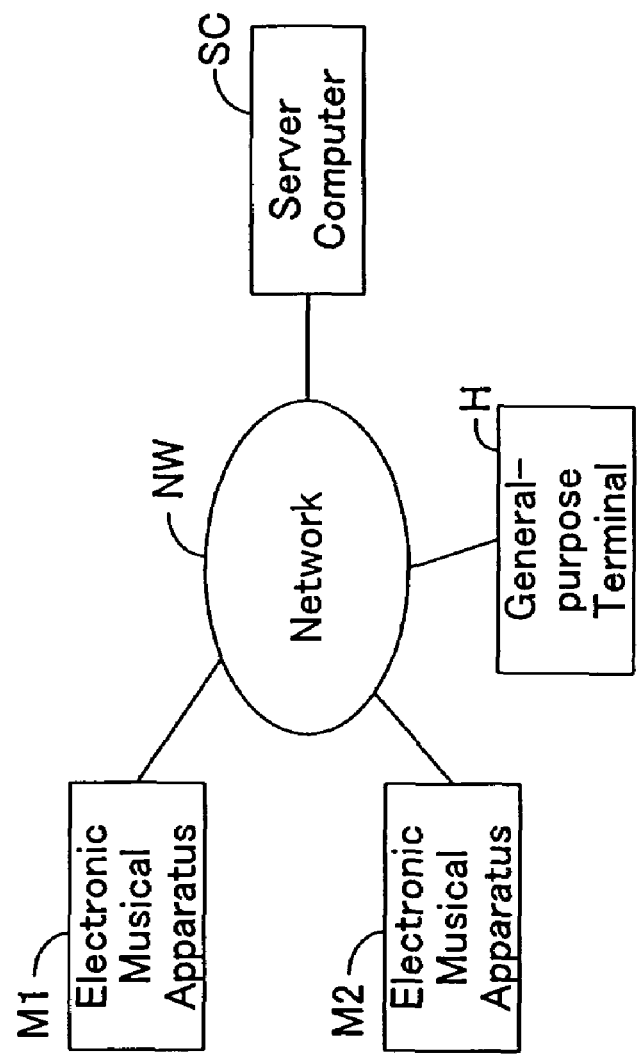
FIG. 1 is a schematic block diagram showing a network to which electronic musical apparatuses, a general-purpose terminal and a server computer according to a first embodiment and second embodiment of the present invention are connected.

A first embodiment of the present invention will now be described with reference to the drawings. FIG. 1 is a block diagram showing an electronic musical apparatus M1, electronic musical apparatus M2 and server computer SC according to the present invention that are connected to a network NW to allow communications, and a general-purpose terminal H (e.g., a personal computer or mobile phone) that is connected to the network NW to allow communications.

Figure 2:
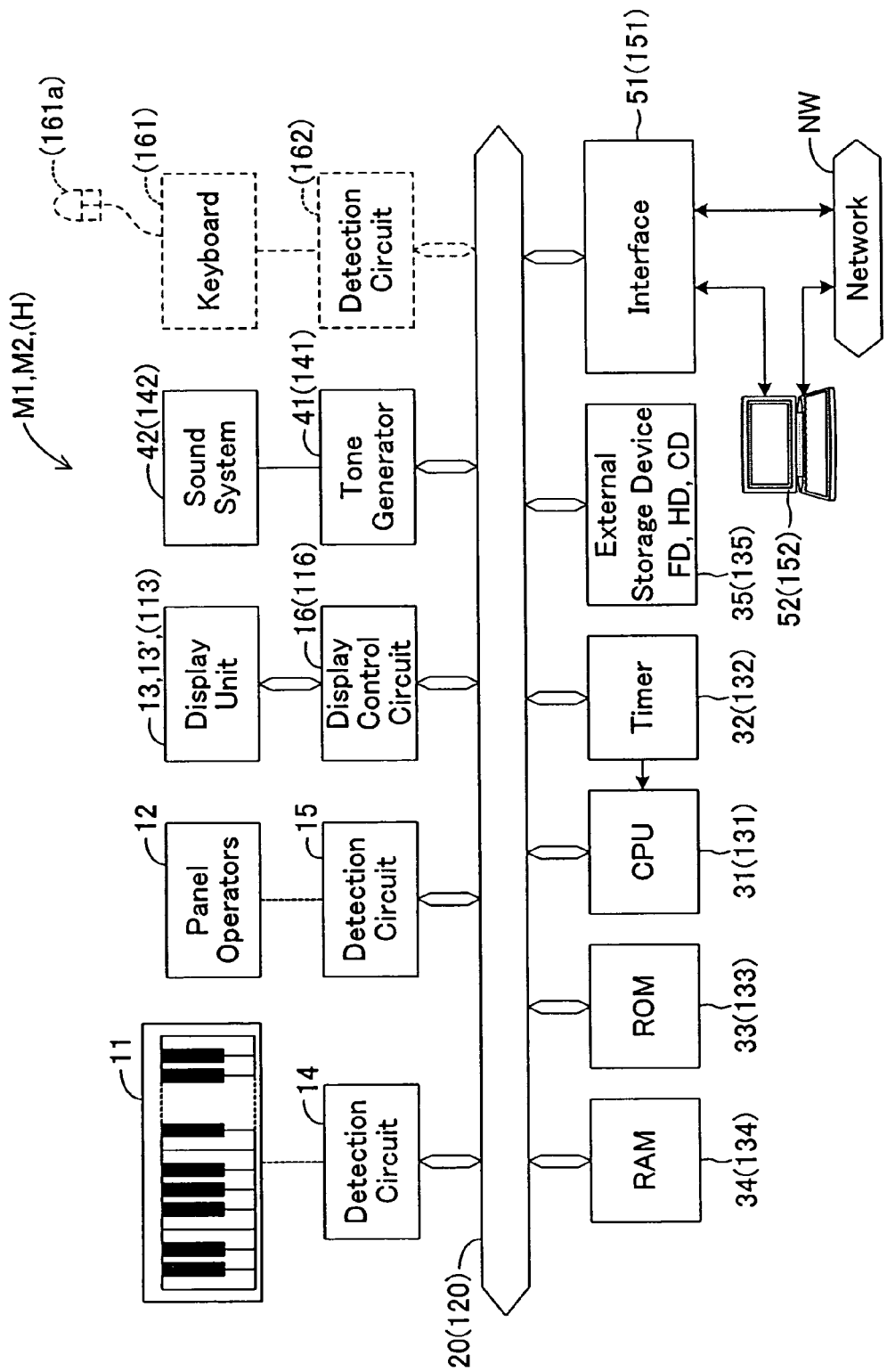
FIG. 2 is a schematic block diagram of the electronic musical apparatuses and the general-purpose terminal according to the first embodiment and second embodiment of the present invention shown in FIG. 1.

The electronic musical apparatus M1, which is an electronic musical instrument, for example, has a keyboard 11, panel operators 12, and a display unit 13 as shown in FIG. 2. The keyboard 11 is composed of a plurality of keys used as performance operators. The depression and release of each key cause generation and halt of a musical tone signal, respectively. The depression and release of keys are detected by ON/OFF operation of key switches, respectively. The key switches provided in corresponding relation to the keys are disposed in a detection circuit 14 which is connected to a bus 20.

The panel operators 12 are formed of a multiplicity of operators that include pushbuttons and are provided on a front panel (more specifically, on the periphery of the display unit 13) of the electronic musical apparatus M1. The panel operators 12 are operated by a user in order to trigger various operations of the electronic musical apparatus M1. Respective operations of the panel operators 12 are detected by ON/OFF operation of operator switches. The operator switches provided in corresponding relation to each operator are disposed in a detection circuit 15 that is connected to the bus 20. The display unit 13, which is configured by a liquid crystal display, etc. displays characters, notes, graphics, and later-explained e-mail messages retrieved from the server computer SC. The display unit 13 has a wide display area (in other words, high resolution), and is capable of displaying in color. Display modes of the display unit 13 are controlled by a display control circuit 16 that is connected to the bus 20.

Connected to the bus 20 are a CPU 31, timer 32, ROM 33, RAM 34, external storage device 35, tone generator 41 and sound system 42. The CPU 31, timer 32, ROM 33 and RAM 34, which configure the main unit of a microcomputer, control various operations of the electronic musical apparatus M1 by executing programs.

Figure 3:
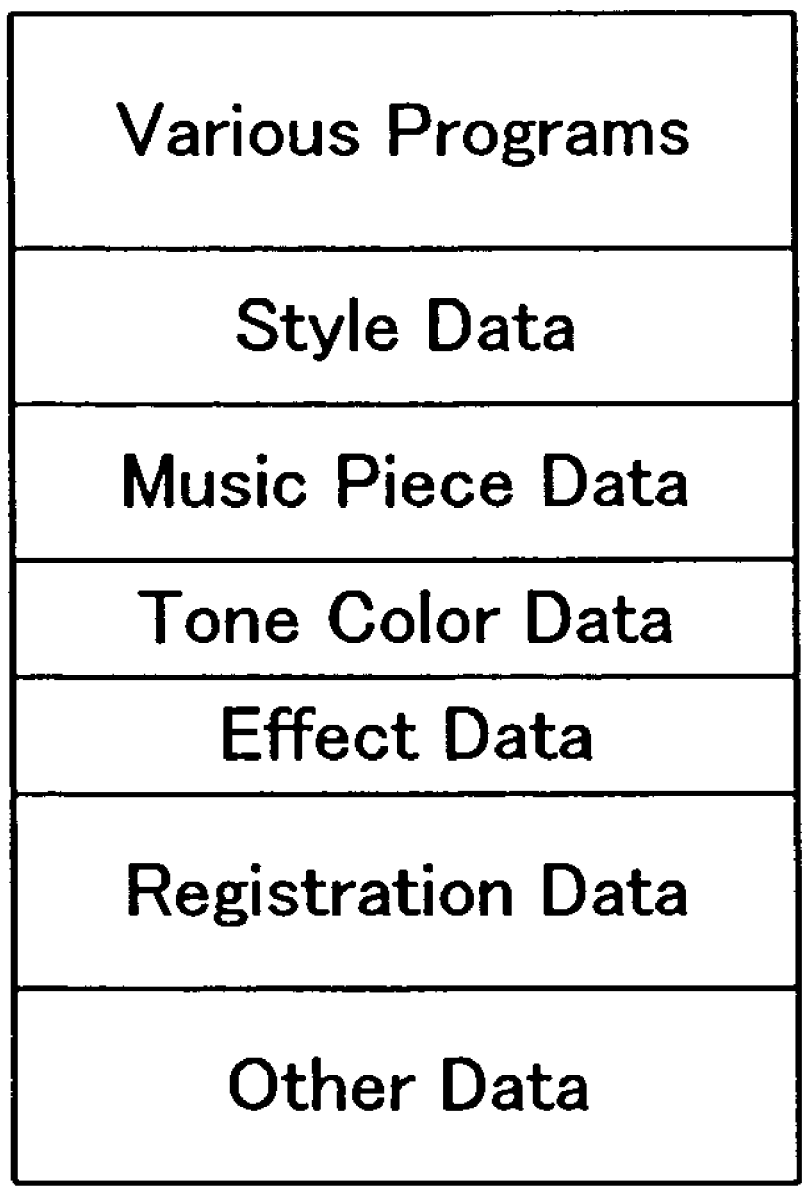
FIG. 3 is a map showing various storage areas of a ROM of the electronic musical apparatuses shown in FIG. 2.
Figure 8:
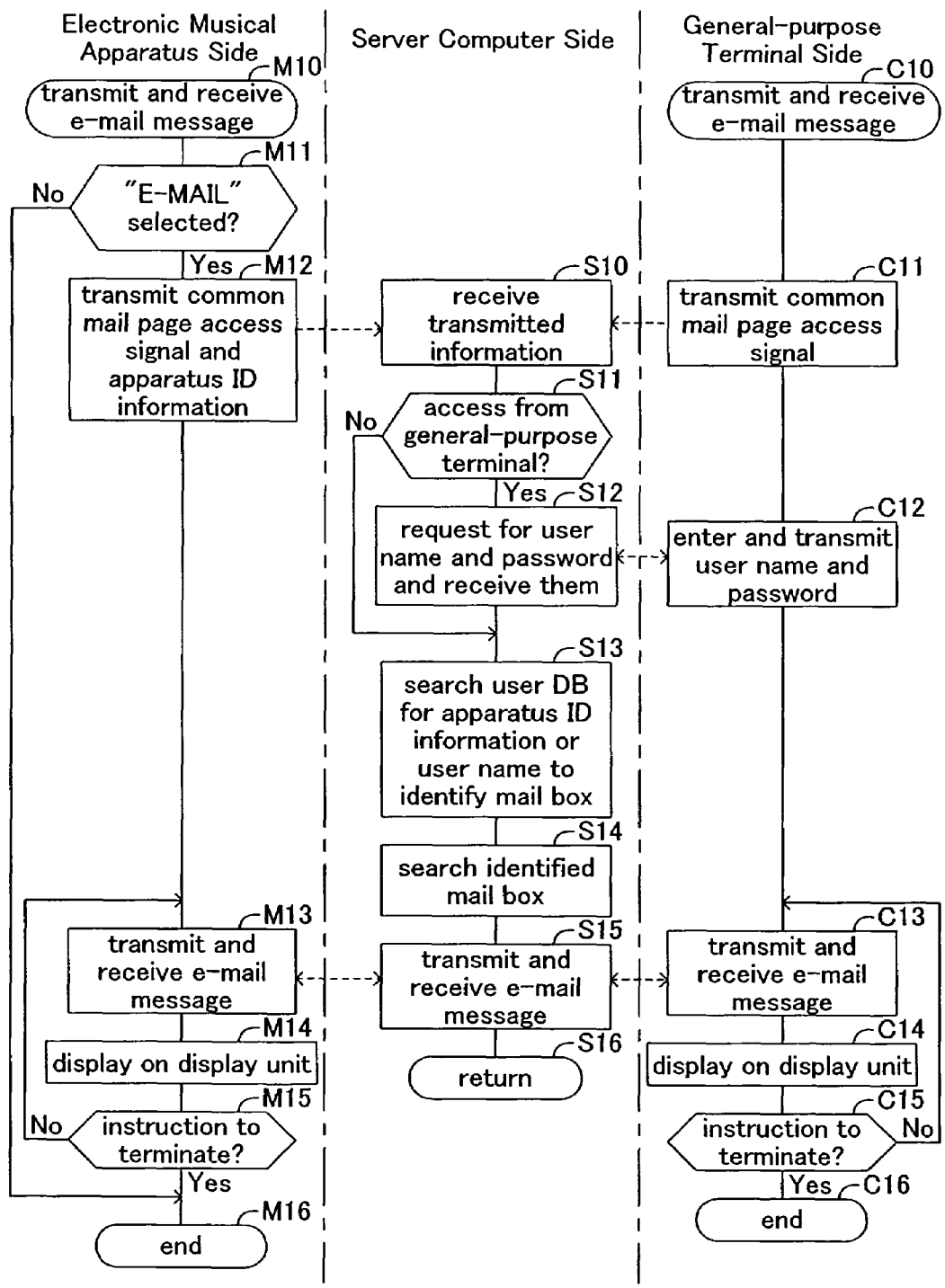
FIG. 8 is a flowchart illustrating an e-mail message transmission and reception program according to the first embodiment of the present invention.

In the ROM 33, as shown in FIG. 3, there are provided various storage areas. In a program storage area there are stored a system program, some of the programs for implementing various functions of the electronic musical apparatus M1, and a later-described program for the electronic musical apparatus that is shown in FIG. 8. In a style data storage area there is stored a series of accompaniment control data for controlling generation of accompaniment tones, the data being provided for each type of automatic accompaniments such as jazz, rock, waltz and march that are applicable to the electronic musical apparatus M1. In a music piece data storage area there is stored automatic performance data for demonstration that is applicable to the electronic musical apparatus M1 to carry out automatic performance.

In a tone color data storage area there is stored a tone color table which stores names of tone colors applicable to the electronic musical apparatus M1, with the tone color names categorized. The tone color data storage area also stores tone color parameter groups provided for each tone color in order to generate a tone signal of each tone color in the tone generator 41. In an effect data storage area there is stored an effect table which stores names of effects applicable to the electronic musical apparatus M1, with the effect names categorized. The effect data storage area also stores effect parameter groups provided for each effect to be added to a tone signal in the tone generator 41.

In a registration data storage area there are stored sets of registration data. Each set of registration data is composed of different kinds of control data for controlling various generation conditions of a tone signal such as tone color, effect and style (type of automatic accompaniment pattern) of a tone signal. The electronic musical apparatus M1 is designed such that an operation of specifying a set of registration data realizes a certain controlled state of musical tone that would require various operations of the panel operators 12. In an additional data storage area there is stored information such as a unique apparatus ID which is previously allocated to an electronic musical apparatus M1 used by a user. Even among the same type of electronic musical apparatuses M1, each individual electronic musical apparatus M1 has its own unique apparatus ID. The apparatus ID can be a production number of the electronic musical apparatus which has been given to the electronic musical apparatus at time of the purchase of the electronic musical apparatus, unique apparatus ID information of the electronic musical apparatus (e.g. an identification number of the electronic musical apparatus) which is given to the user through a communication network or by post or delivery service after the purchase of the electronic musical apparatus, or something different. The apparatus ID can be previously stored in the ROM 33 but may be stored in flash memory, for example, at any given time after the purchase of the electronic musical apparatus.

The external storage device 35 includes a hard disk HD previously equipped in the electronic musical apparatus M1, various storage media applicable to the electronic musical apparatus M1 such as compact disk CD and flexible disk FD, and drive units for each storage medium in order to enable storing and reading of voluminous data and programs. In the storage media there are stored various programs and data that are the same types as those stored in the ROM 33 but different from them. More specifically, programs and data stored in these storage media include various kinds of programs, style data, music data, tone color data, effect data and registration data.

The tone generator 41 generates musical tone signals in accordance with performance information (e.g., key-on signal, key-off signal, etc. input from the keyboard 11) sent from the CPU 31, adds various effects such as reverberation and chorus to the generated musical tone signals, and outputs the effect-added musical tone signals. Under the control by the CPU 31, musical tone elements including tone colors of tone signals to be generated by the tone generator 41 and effects to be added to the tone signals are controlled on the basis of control parameters including tone color parameters and effect parameters supplied from the ROM 33 or external storage device 35 (RAM 34 in some cases). To control musical tone elements and effects, generally, in addition to tone color parameters and effect parameters stored in the ROM 33 in associated relation with the tone color table, tone color parameters and effect parameters contained in the registration data stored in the ROM 33 or tone color parameters and effect parameters stored in the external storage device 35 are also used. However, the performance capabilities of the tone generator 41 vary among models; each model has its own limit on available musical tone elements including tone colors and effects to be added to tone signals.

Tone signals output from the tone generator 41 are supplied to a sound system 42. The sound system 42, which is composed of an amplifier, speakers, etc., generates musical tones corresponding to the supplied tone signals.

To the bus 20 an interface circuit 51 is also connected. The interface circuit 51 inputs various data such as automatic performance data and tone control data and various programs from an external electronic musical apparatus 52 such as an electronic musical apparatus or personal computer. The interface circuit 51 is allowed to connect with the server computer SC through the network NW (e.g., the Internet) in order to transmit/receive various content items, programs and data supplied by the server computer SC.

Since the electronic musical apparatus M2 is designed to have the same construction as the electronic musical apparatus M1, as shown in FIG. 2, each component of the electronic musical apparatus M2 functions in a manner similar to that of the electronic musical apparatus M1. Therefore, detailed descriptions of the electronic musical apparatus M2 will be omitted. However, the electronic musical apparatus M2 has a display unit 13' which is different from the display unit 13 of the electronic musical apparatus M1. More specifically, the display unit 13' of the electronic musical apparatus M2 is similar to the display unit 13 of the electronic musical apparatus M1 in that the display unit 13' is also configured by a liquid crystal display, etc., and displays characters, notes, graphics, and e-mail messages retrieved from the server computer SC, however, the display unit 13' has a narrow display area (in other words, low resolution), and is capable of displaying only in black and white.

The general-purpose terminal H is formed without the keyboard 11, panel operators 12 and detection circuits 14 and 15 of the electronic musical apparatuses M1 and M2 as shown in FIG. 2. Other components of the general-purpose terminal H function in a manner similar to the components of the electronic musical apparatuses M1 and M2, being numbered a display unit 113, display control circuit 116, CPU 131, timer 132, ROM 133, RAM 134, external storage device 135, tone generator 141, sound system 142, interface circuit 151 and external electronic musical apparatus 152. Detailed descriptions of these components will be omitted. As shown in dashed lines in FIG. 2, furthermore, the general-purpose terminal H is provided with a keyboard 161, mouse 161a and display unit 113. The keyboard 161 is composed of a plurality of operators. Respective operations of the operators of the keyboard 161 are detected by on/off operation of operator switches provided in associated relation with respective operators in a detection circuit 162 connected to a bus 120 of the general-purpose terminal H. The mouse 161a is connected to the detection circuit 162 via the keyboard 161. Directions to which the mouse 161a moves, the amount of movement and clicks of the mouse 161a are detected by the detection circuit 162.

The display unit 113, which is configured by a liquid crystal display, etc. displays characters, notes, graphics, and e-mail messages retrieved from the server computer SC. The display unit 113 has a wide display area (in other words, high resolution), and is capable of displaying in color. Display modes of the display unit 113 are controlled by the display control circuit 116 that is connected to the bus 120 of the general-purpose terminal H. In the ROM 133 of the general-purpose terminal H there are previously stored various programs including a program for the general-purpose terminal shown in FIG. 8 and various data.

As shown in a block diagram of FIG. 4, the server computer SC has a CPU 201, timer 202, ROM 203, RAM 204 and external storage device 205 that are connected to a bus 200. The CPU 201 runs programs in order to control various operations of the server computer SC across-the-board. The timer 202 counts time. In the ROM 203 there are previously stored a system program, some of the programs necessary for realizing various functions of the server computer SC and various data. In the RAM 204 there are temporarily stored programs and files to be used at the execution of the programs.

The external storage device 205 includes various storage media such as a hard disk HD, compact disk CD and flexible disk FD and drive units for the storage media. These storage media are capable of storing and reading voluminous data and programs, storing various programs including a program for the server computer shown in FIG. 8. In the hard disk HD there are constructed a user database 206a and e-mail database 206b.

In the user database 206a there is stored user information for identifying the user of the electronic musical apparatuses M1 or M2, or the general-purpose terminal H at the access by the electronic musical apparatuses M1 or M2, or the general-purpose terminal H to the server computer SC. The user information is stored in a manner which allows searching. The user information is composed of user names, passwords and user-obtained e-mail information for transmitting and receiving e-mail messages (e.g., e-mail account, password, etc.). For the use of the electronic musical apparatuses M1 and M2 by the users, the user database 206a also stores apparatus ID information of the electronic musical apparatuses M1 and M2 and model information for identifying the model (e.g., M1 or M2) in associated relation with (bound to) the user information. In the user database 206a, as described later on, there is also stored mail box identification information for identifying a mail box constructed in the e-mail database 206b in associated relation with (bound to) the user information.

In the e-mail database 206b there is constructed mail boxes that are associated with users' e-mail information and mail box identification information. The mail boxes are designed to temporarily store e-mail messages on a well-known e-mail transmission and reception process executed by the server computer SC (more specifically, the CPU 201). On executing the e-mail transmission and reception process, the CPU 201 uses e-mail information which is associated with the mail boxes. In addition, e-mail messages that are stored in the mail boxes to be delivered to the user of the electronic musical apparatus M1 or M2 are appropriately adjusted so that the display modes of the respective e-mail messages match with the respective model of the electronic musical apparatuses M1 and M2 to be delivered. More specifically, in consideration of the display capabilities of the electronic musical apparatuses M1 and M2, for example, e-mail messages to be delivered to the electronic musical apparatus M1 are stored in a manner such that the messages are displayed with large characters in colors, while e-mail messages to be delivered to the electronic musical apparatus M2 are stored in a manner such that the messages are displayed with small characters in black and white.

Also connected to the bus 200 is a communication interface circuit 207 (hereinafter referred to as communication I/F 207). The communication I/F 207 is connected to the network NW in order to allow the server computer SC to communicate with the electronic musical apparatuses M1 and M2, and the general-purpose terminal H.

Figure 5A:
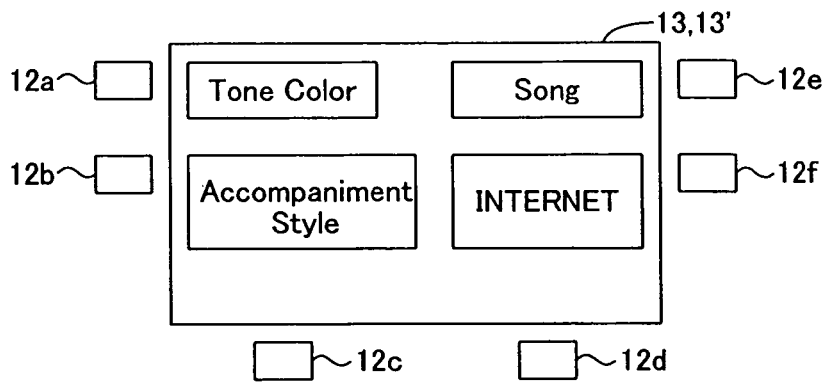
FIGS. 5A to 5D show examples of a display screen displayed on a display unit of the electronic musical apparatuses shown in FIG. 2.

Next explained will be operations of a first embodiment constructed as described above. First, general operations of the electronic musical apparatuses M1 and M2 will be briefly described. A user of the electronic musical apparatus M1 or M2 operates the panel operators 12 to specify the style (type of accompaniment tone) and tone color of tone signals to be generated by the tone generator 41, the effect to be added to the tone signals, and so on. This specification will be concretely described with reference to FIGS. 5A to 5D. When the user starts the electronic musical apparatus M1 or M2, the CPU 31 runs a specified program (not shown) that is stored in the ROM 33 in order to display an initial screen (hereinafter, referred to as a top menu screen) on the display unit 13 or 13' as shown in FIG. 5A. The user then depresses one of pushbuttons 12a to 12f that comprise the panel operators 12 in order to select a desired item. The respective pushbuttons 12a to 12f are disposed near each item of the top menu screen displayed on the display unit 13 or 13'.

Figure 5B:
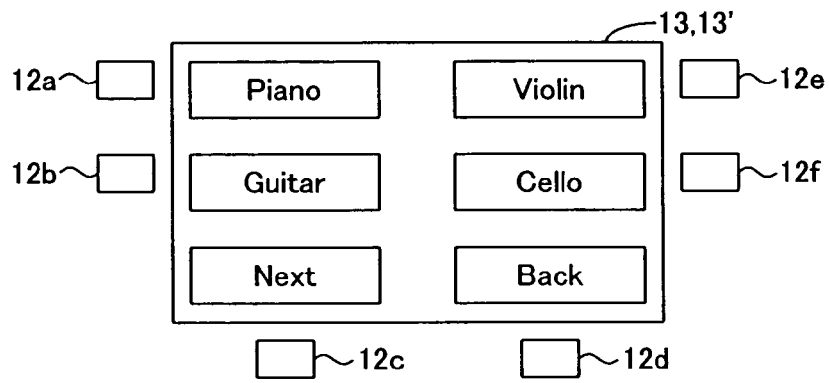
Figure 5C:
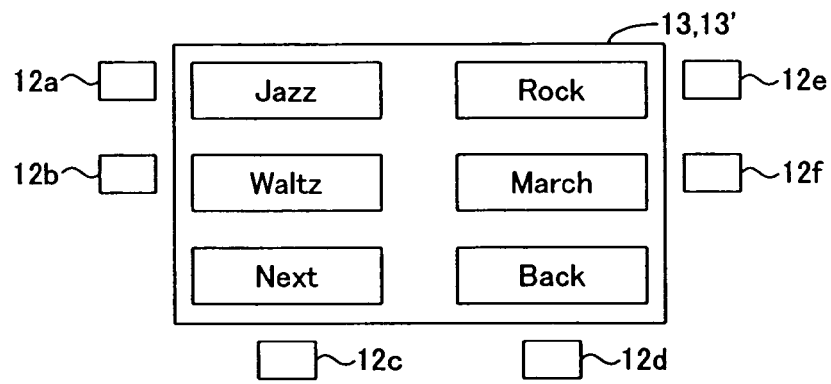
Figure 5D:
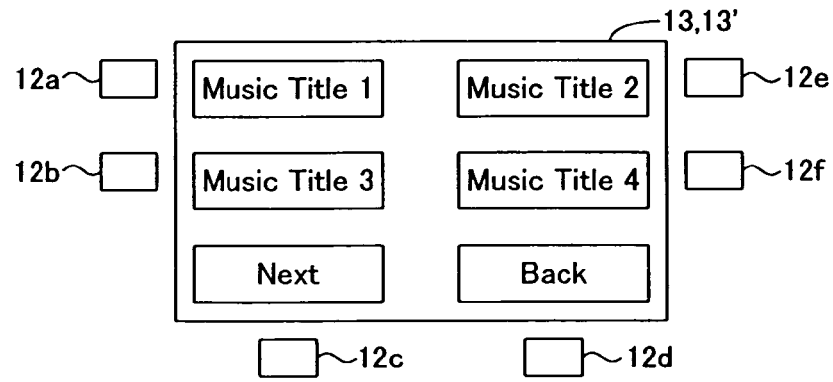

More specifically, when the pushbutton 12a disposed next to "TONE COLOR" displayed on the display unit 13 or 13' is depressed, the CPU 31 refreshes the display screen of the display unit 13 or 13' as shown in FIG. 5B. The user then depresses one of the pushbuttons 12a to 12f disposed next to names of possible tone colors, and "NEXT" representative of moving the screen forward and "BACK" representative of moving the screen backward in order to select his/her desired tone color. When the pushbutton 12b disposed next to "ACCOMPANIMENT STYLE" is depressed on the top menu screen, the CPU 31 refreshes the display screen of the display unit 13 or 13' as shown in FIG. 5C. The user then depresses one of the pushbuttons 12a to 12f disposed next to names of possible accompaniment styles, and "NEXT" and "BACK" in order to select his/her desired accompaniment style. When the pushbutton 12e disposed next to "SONG" is depressed on the top menu screen, the CPU 31 refreshes the display screen of the display unit 13 or 13' as shown in FIG. 5D. The user then depresses one of the pushbuttons 12a to 12f disposed next to titles of possible music pieces, and "NEXT" and "BACK" in order to select his/her desired music piece.

By the above-described operations, various data on tone color, effect, accompaniment style and music piece stored in the ROM 33 or external storage device 35 is transmitted to the tone generator 41 or written into the RAM 34. Then, user's performance operation by use of the keyboard 11 causes the tone generator 41 to generate, in accordance with the user's performance operation, tone signals having user's desired tone color and effect. In addition, the tone generator 41 is caused to generate the tone signals in an automatic performance pattern that corresponds to the above-selected desired accompaniment style or to generate accompaniment tone signals corresponding to the desired accompaniment style in parallel with the tone signals generated in accordance with the user's performance operation. Furthermore, the tone generator 41 is also able to generate automatic performance signals that correspond to the above-selected music piece. Tone signals generated by the tone generator 41 are then supplied to the sound system 42 and emitted from the sound system 42 as musical tones.

When the user depresses the pushbutton 12f disposed next to "INTERNET" displayed on the top menu screen, the user can access the server computer SC through the network NW to retrieve various content data. As described above, when the electronic musical apparatus M1 or M2 accesses the server computer SC, the server computer SC transmits information indicative of a menu (hereinafter, referred to as a content menu) for retrieving content previously provided for respective models of the electronic musical apparatuses M1 and M2.

Figure 6A:
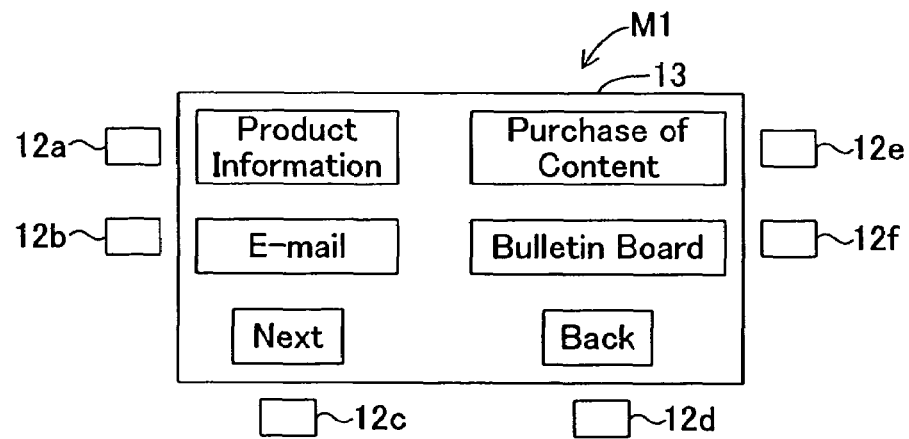
FIGS. 6A and 6B show examples of a content menu displayed on the display unit of the electronic musical apparatuses shown in FIG. 2.
Figure 6B:
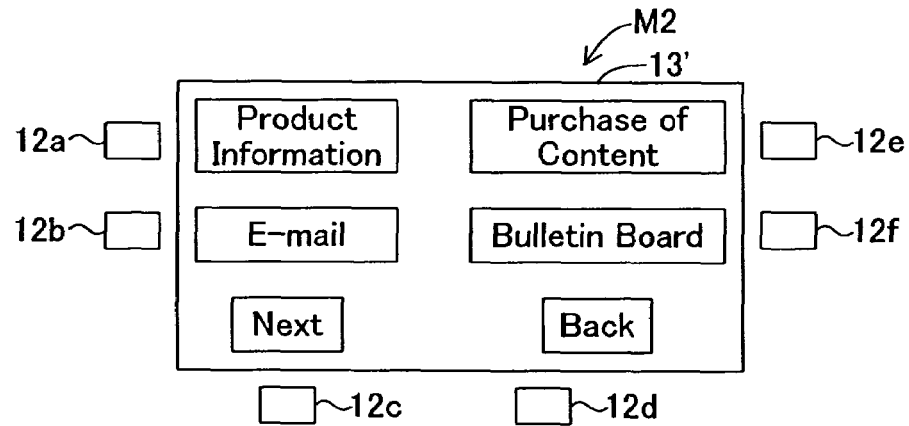

On receiving the above information indicative of a content menu, the electronic musical apparatus M1 or M2 displays a content menu screen on the display unit 13 or 13' as shown in FIGS. 6A and 6B. Since the content menu screen is provided separately for each of the electronic musical apparatuses M1 and M2, the content menu is displayed in accordance with respective display modes which follow respective display capabilities of the display units 13 and 13'. On the electronic musical apparatus M1 having the display unit 13, more specifically, the content menu is displayed with large characters in colors as shown in FIG. 6A. On the electronic musical apparatus M2 having the display unit 13', on the other hand, the content menu is displayed with small characters in black and white as shown in FIG. 6B.

When the content menu is displayed, as described above, the user can retrieve his/her desired information. More specifically, the user depresses one of the pushbuttons 12a to 12f to retrieve a content item. When the user depresses the pushbutton 12b disposed next to "E-MAIL", the electronic musical apparatus M1 or M2 can receive and transmit e-mail messages from a mail box constructed for each user in the server computer SC. By the general-purpose terminal H, in addition, the user can also access his/her mail box. Even when the user uses the general-purpose terminal H, instead of the electronic musical apparatuses M1 and M2, therefore, the user can use his/her mail box to receive and transmit e-mail messages. Hereinafter, the transmission and reception of e-mail messages will be described.

Figure 7:
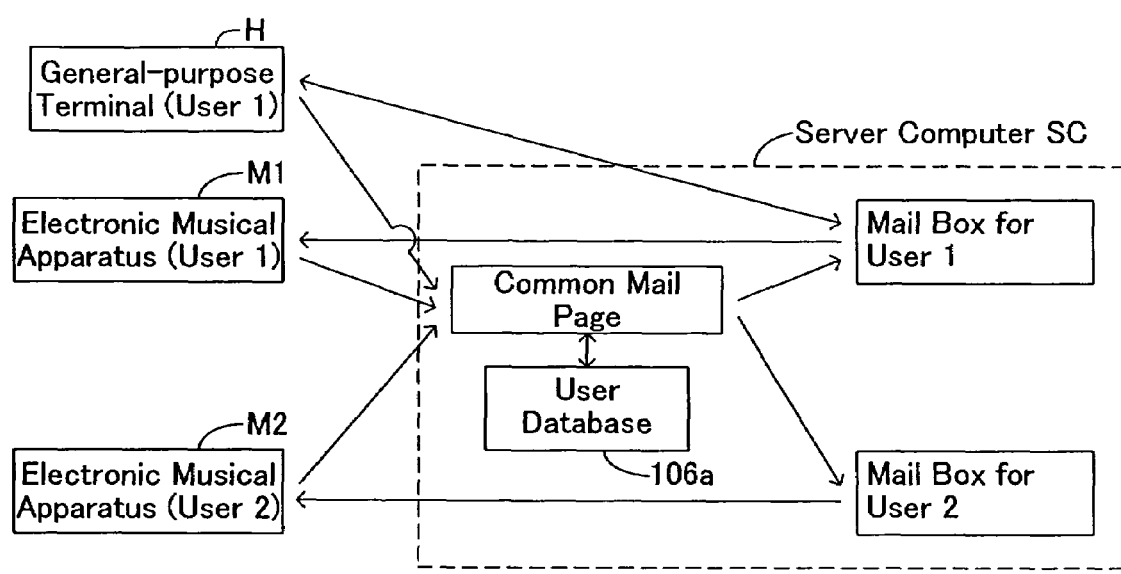
FIG. 7 is a schematic diagram illustrating flows of e-mail message retrieval between the electronic musical apparatuses and the general-purpose terminal, and the server computer according to the first embodiment of the present invention.

In the first embodiment, as briefly shown in FIG. 7, the electronic musical apparatus M1 or M2, or the general-purpose terminal H used by the user uses a mail box constructed for each user to transmit and receive e-mail messages. More specifically, when the electronic musical apparatus M1 or M2, or the general-purpose terminal H accesses to a common mail page of the server computer SC, the server computer SC identifies the mail box of the electronic musical apparatus M1 or M2, or the general-purpose terminal H by using the user database 206a. The server computer SC then transmits e-mail messages sent for the user to the electronic musical apparatus M1 or M2, or the general-purpose terminal H or transmits e-mail messages sent from the user to the outside.

The transmission and reception of e-mail messages will be described in detail with reference to the flowchart of an e-mail message transmission and reception program shown in FIG. 8. Retrieving e-mail messages, the electronic musical apparatuses M1 and M2 run the same e-mail message transmission and reception program to transmit or receive e-mail messages. In the following description, therefore, detailed explanation will be given with an example of the electronic musical apparatus M1. The e-mail message transmission and reception program is executed by the CPU 31 of the electronic musical apparatus M1, the CPU 131 of the general-purpose terminal H and the CPU 201 of the server computer SC. More specifically, the CPU 31 of the electronic musical apparatus M1 starts running the e-mail message transmission and reception program at predetermined short periods at step M10 and determines at step M11 whether "E-MAIL" has been selected by the user. When the pushbutton 12b has not been depressed by the user on the content menu screen, the CPU 31 gives "No" at step M11 and proceeds to step M16 to temporarily terminate the program.

When the pushbutton 12b has been depressed by the user, on the other hand, the CPU 31 gives "Yes" at step M11 and proceeds to step M12. At step M12 the CPU 31 transmits, to the CPU 201 of the server computer SC, apparatus ID information and a common mail page access signal necessary for accessing the common mail page. More specifically, the CPU 31 retrieves common mail page access information (e.g., URL information (Uniform Resource Locator)) that has been previously stored in the ROM 33. The CPU 31 also retrieves apparatus ID information stored in the ROM 33 or the like. Through the interface circuit 51 and network NW, the CPU 31 then transmits the common mail page access signal on the basis of the retrieved common mail page access information along with the apparatus ID information.

On the general-purpose terminal H, on the other hand, the CPU 131 starts running the e-mail message transmission and reception program at predetermined short periods at step C10 and transmits a common mail page access signal at step C11. More specifically, the CPU 131 runs a browser program which is not shown to prompt the user to enter common mail page access information. Using the keyboard 161 and mouse 161a, the user enters the URL of the common mail page of the server computer SC, for example. When the common mail page access information has been entered, the CPU 131 transmits, via the interface circuit 151 and network NW, a common page access signal on the basis of the entered common mail page access information and accesses the server computer SC.

On the server computer SC, the CPU 201 receives, at step S10, the information transmitted at the transmission process of step M12 or step C1, and temporarily stores the above-received information in the RAM 204.

After the reception process of step S10, the CPU 201 determines at step S11 whether the apparatus currently accessing the server computer SC is the general-purpose terminal H. More specifically, when the CPU 201 has received apparatus ID information at step S10, the CPU 201 gives "No" and proceeds to step S13. When the CPU 201 has not received apparatus ID information at step S10, on the other hand, the CPU 201 gives "Yes" and proceeds to step S12. At step S12 the CPU 201 transmits, to the general-purpose terminal H, screen data requesting the transmission of a user name and password, and receives the transmitted user name and password. On the general-purpose terminal H, in accordance with the screen data transmitted by the processing of step S12, the CPU 131 displays a screen to prompt the user to enter his/her user name and password. In accordance with the entry screen displayed on the display unit 113, the user then enters his/her user name and password that the user has previously stored in the server computer SC. The CPU 131 then transmits the entered user name and password to the server computer SC.

On the server computer SC, at step S13 the CPU 201 searches the user database 206a to identify the mail box of the user, using the apparatus ID information received at the reception process of step S10 or the user name of the general-purpose terminal H received at the reception process of step S12. More specifically, the CPU 201 searches the user database 206a on the basis of the received apparatus ID information or user name, and retrieves mail box identification information that is associated with the apparatus ID information or user name that matches with the received apparatus ID information or user name. Thus, the CPU 201 identifies the mail box of the user of the electronic musical apparatus M1 or general-purpose terminal H which is currently accessing the server computer SC, and proceeds to step S14.

At step S14 the CPU 201 searches the mail box that has been identified at step S13 to retrieve an e-mail message stored in the mail box. More specifically, on the basis of the mail box identification information retrieved at step S13, the CPU 201 searches the mail box, using the e-mail database 206b. The CPU 201 then retrieves an e-mail message stored in the identified mail box, temporarily stores the retrieved e-mail message in the RAM 204 and proceeds to step S15.

At step S15 the CPU 201 transmits the e-mail message temporarily stored in the RAM 204 at step S14 to the electronic musical apparatus M1 or general-purpose terminal H. More specifically, the CPU 201 retrieves the e-mail message from the RAM 204 and transmits the retrieved e-mail message to the electronic musical apparatus M1 or general-purpose terminal H via the communication I/F 207 and network NW.

On the electronic musical apparatus M1, the CPU 31 receives, at step M13 via the interface circuit 51 and network NW, the e-mail message transmitted at the transmission process of step S15 and proceeds to step M14. At step M14 the CPU 31 displays the received e-mail message on the display unit 13. More specifically, the CPU 31 supplies, to the display control circuit 16 via the bus 20, data representative of the received e-mail message, and on the basis of the supplied data, causes the display unit 13 to display the received e-mail message.

Figure 9A:
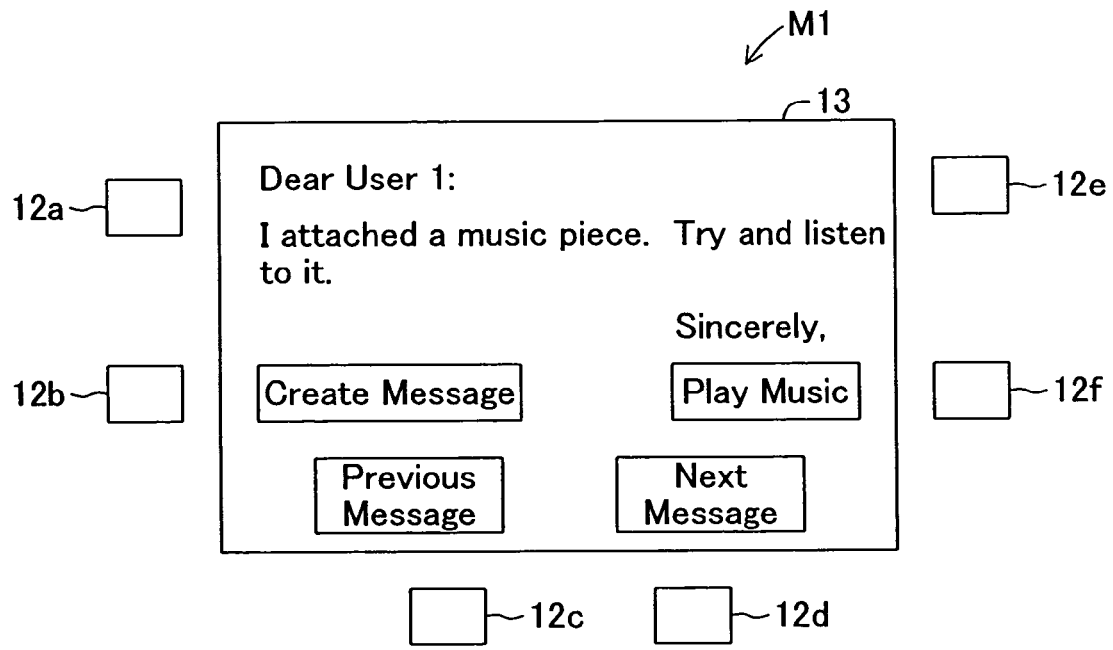
FIGS. 9A and 9B show examples of an e-mail message displayed on the display unit of the electronic musical apparatuses shown in FIG. 2.

In accordance with the CPU 31, the display control circuit 16 controls the display unit 13 on the basis of the data representative of the received e-mail message, and displays the e-mail message as shown in FIG. 9A. Since the e-mail message has been adjusted in accordance with the display capabilities of the display unit 13, the message is displayed with large characters in color. When music data is attached to the e-mail message, for example, the user is allowed to reproduce the attached music data by depressing the pushbutton 12f.

The user is also allowed to create and transmit a reply message to the sender by depressing the pushbutton 12b. The transmission of a reply message will be briefly described. When the pushbutton 12b is depressed, the display screen is refreshed to display a software keyboard on the display unit 13, for example. The user then create a reply message, using the displayed software keyboard. The CPU 31 then repeats step M13 on the basis of the "No" determination at later-described step M15, and transmits the reply message to the user's mail box in the server computer SC. The reply message transmitted to the mail box is then transmitted by the server computer SC to the outside in accordance with a well-known transmission manner, using the user's e-mail account.

Figure 9B:
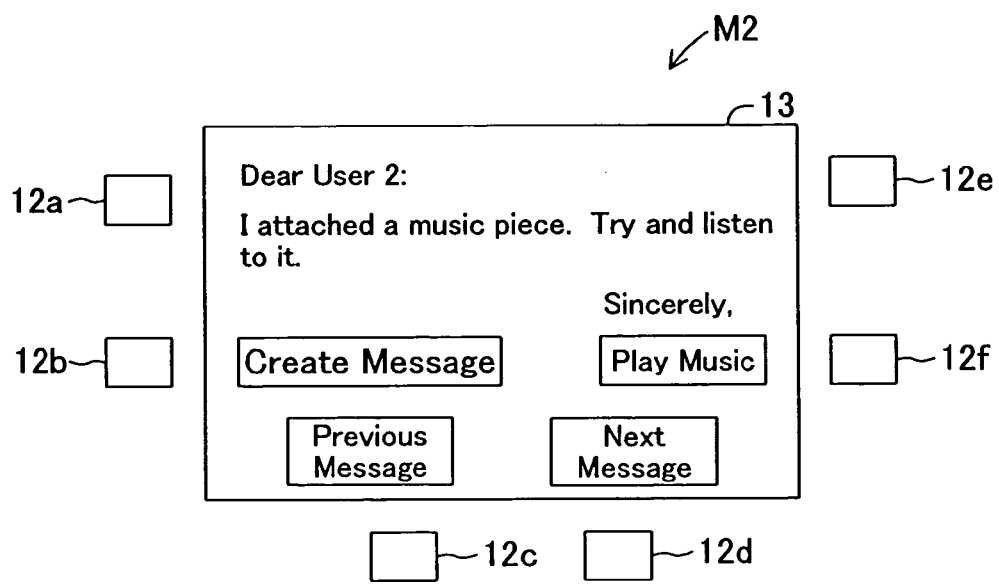

When the electronic musical apparatus M2 executes the above-described steps to display an e-mail message, on the other hand, the e-mail message is displayed with small characters in black and white as shown in FIG. 9B due to the adjustment on the basis of the display capabilities of the display unit 13'. Even in the cases where an e-mail message has voluminous characters to be displayed, therefore, the e-mail message is displayed with small characters to suit the display area of the display unit 13' and display all the information within a screen.

After the display process of step M14, the CPU 31 proceeds to step M15 and determines whether the user has instructed to terminate the transmission and reception of e-mail messages from/to the server computer SC. More specifically, when the user has not instructed to terminate, the CPU 31 gives "No" and returns to step M13 to repeat steps M13 and M14 until the user instructs to terminate. When the user has instructed to terminate, on the other hand, the CPU 31 gives "Yes" and proceeds to step M16 to temporarily terminate the e-mail message transmission and reception program.

On the general-purpose terminal H, furthermore, the CPU 131 executes the processes of steps C13 to C16 to display an e-mail message on the display unit 113 and transmit a reply message. Detailed descriptions about processes of steps C13 to C16 will be omitted because these processes are similar to the above-described processes of steps M13 to M16 executed by the CPU 31 of the electronic musical apparatus M1.

According to the present embodiment, as is evident from the above descriptions, the electronic musical apparatus M1 and electronic musical apparatus M2 are capable of accessing the mail box of their user by sending apparatus ID information at the connection with the server computer SC disposed on the network NW. As a result, the users of the electronic musical apparatuses M1 and M2 can transmit and receive e-mail messages without entering their user name and password. Therefore, the users can transmit and receive e-mail messages quite easily even with the apparatuses such as the electronic musical apparatuses M1 and M2 that are not provided with separate input means (e.g., keyboard and mouse).

Moreover, the server computer SC stores e-mail messages in the mail boxes constructed in associated relation with user information for identifying the user of the electronic musical apparatus M1 or electronic musical apparatus M2. By retrieving the apparatus ID information of the electronic musical apparatus M1 or electronic musical apparatus M2 that is currently accessing the server computer SC, therefore, the server computer SC is able to identify the user of the apparatus and his/her mail box to transmit and receive e-mail messages of the user. As a result, as well, the users of the electronic musical apparatuses M1 and M2 can transmit and receive e-mail messages without entering their user name and password. Therefore, the users can transmit and receive e-mail messages quite easily even with the apparatuses such as the electronic musical apparatuses M1 and M2 that are not provided with separate input means (e.g., a keyboard and mouse).

2. Second Embodiment

Figure 10:
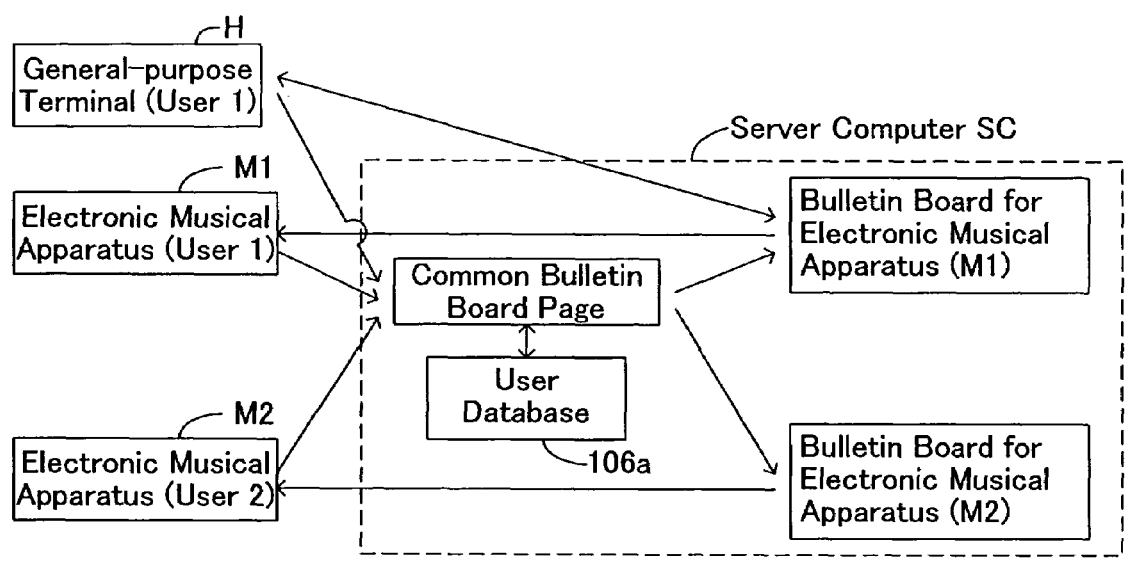
FIG. 10 is a diagram illustrating flows of electronic bulletin board text data retrieval between the electronic musical apparatuses and the general-purpose terminal, and the server computer according to the second embodiment of the present invention.

The above-described first embodiment is designed such that the electronic musical apparatuses M1 and M2 and the general-purpose terminal H access the server computer SC, and the server computer SC identifies the mail box of the user of each apparatus to transmit and receive e-mail messages, in other words, text data. As described above, since the transmission and reception of text data is possible between the server computer SC and the electronic musical apparatuses M1 and M2 and general-purpose terminal H, the above-described first embodiment may be modified such that text data, instead of e-mail messages, stored in an electronic bulletin board system provided in the server computer SC, is transmitted in accordance with the respective models of the electronic musical apparatuses M1 and M2 as briefly shown in FIG. 10. Hereinafter, this second embodiment will be explained with the same numbers being given to the parts that are substantially common between the first embodiment and the second embodiment in order to omit detailed explanation.

The server computer SC according to the second embodiment stores model information indicative of the respective models of the electronic musical apparatuses M1 and M2 in associated relation with (bound to) user information stored in the user database 206a of the external storage device 205. In the hard disk HD of the external storage device 205 of the server computer SC according to the second embodiment, furthermore, there is constructed a bulletin board database 206c instead of or in addition to the e-mail database 206b of the first embodiment. Stored in the bulletin board database 206c is bulletin board text data that is fell into a plurality of categories, each of which is provided for each model of the electronic musical apparatuses M1 and M2. The bulletin board text data is stored in a searchable manner. Therefore, each category of the bulletin board text data is associated with (bound to) each model information of the electronic musical apparatuses M1 and M2. In this categorization, only one model may be fell into one category, however, a plurality of models may be grouped into one category.

Figure 11:
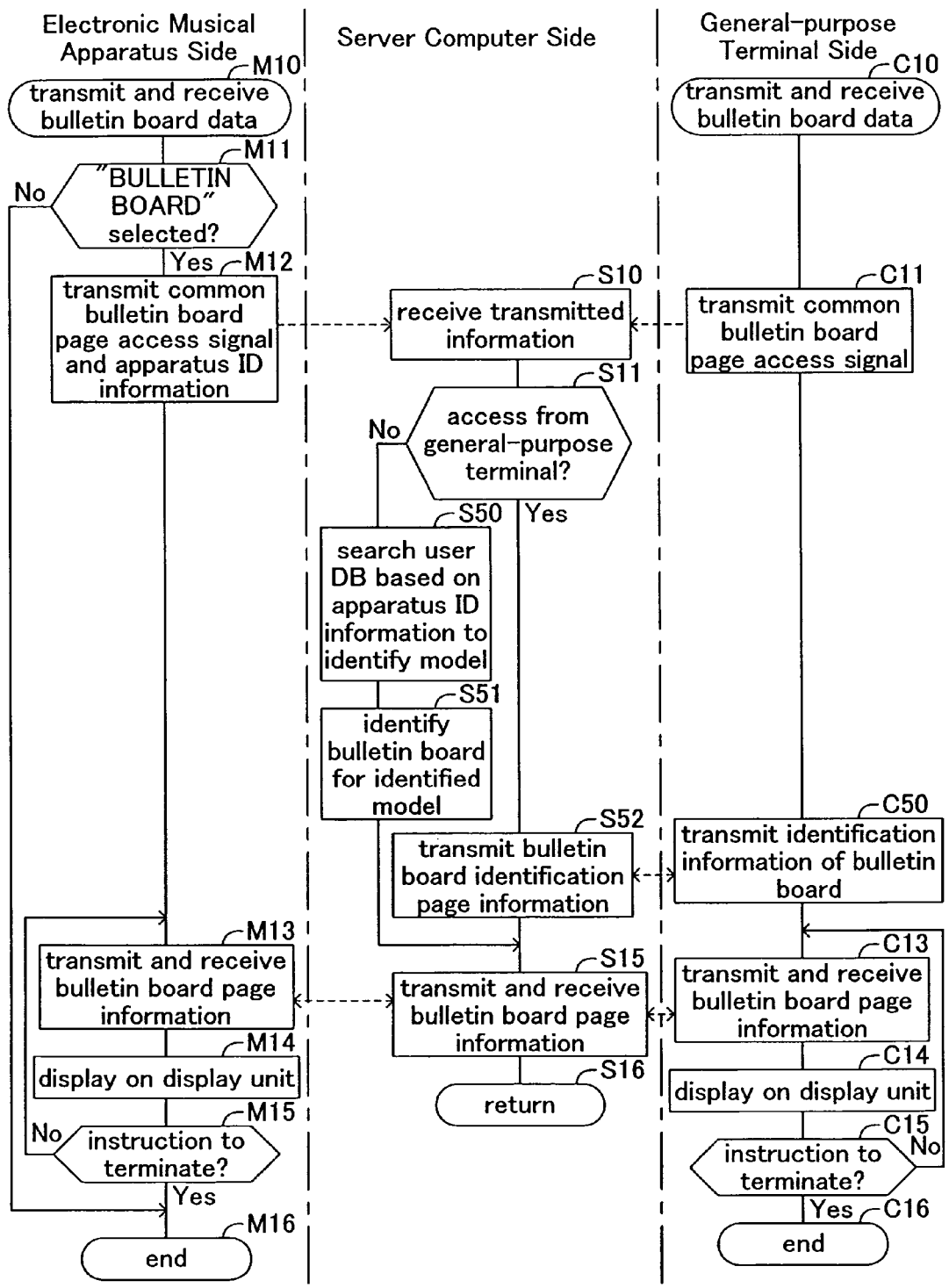
FIG. 11 is a flowchart illustrating an electronic bulletin board text data transmission and reception program according to the second embodiment of the present invention.

In a bulletin board text data transmission and reception program of the second embodiment, as shown in a flowchart of FIG. 11, steps S12 to S14 of the flowchart of FIG. 8 are omitted, but steps S50 to S52 and step C50 are added. More specifically, on the basis of the determination of "No" given at step S11, at step S50 the CPU 201 of the server computer SC identifies the model of the electronic musical apparatus M1 or electronic musical apparatus M2 that is currently accessing the server computer SC. To be more specific, the CPU 201 searches the user database 206a, using the apparatus ID information received at step S10. The CPU 201 then retrieves the model information that is associated with the apparatus ID information that matches with the received apparatus ID information to identify the model, and proceeds to step S51.

At step S51 the CPU 201 identifies a bulletin board that is fell into a category which is associated with the model identified at step S50. More specifically, the CPU 201 extracts bulletin board text data stored in the category that is associated with the model information matching with the model information that has been retrieved at step S50, and temporarily stores the extracted bulletin board text data in the RAM 204. The CPU 201 then proceeds to step S15.

At step S11 when the CPU 201 determines that the general-purpose terminal H is currently accessing, in other words, when the CPU 201 gives "Yes", on the other hand, the CPU 201 transmits bulletin board identification page information to the general-purpose terminal H and receives identification information of a bulletin board at step S52. The bulletin board identification page information is page information indicative of the name of the model or the category of bulletin board text data currently stored in the bulletin board database 206c.

On the general-purpose terminal H, at step C50 the CPU 131 receives the bulletin board identification page information transmitted at the transmission process of step S52 and transmits identification information of a bulletin board. More specifically, The CPU 131 displays the received bulletin board identification page information on the display unit 113 and prompts the user to select the model name or category that the user desires to check. The user then selects the model name or category, using the keyboard 161 or mouse 161a. When the model name or category has been selected, the CPU 131 transmits identification information indicative of the selected model name or category to the server computer SC.

On the server computer SC, at step S15 the CPU 201 transmits bulletin board text data stored in the category that has been identified at step S51 or bulletin board text data stored in the category associated with the identification information received at step S52 to the electronic musical apparatus M1, electronic musical apparatus M2 or general-purpose terminal H. In the manner similar to the above-described first embodiment, the electronic musical apparatus M1, electronic musical apparatus M2 or general-purpose terminal H receives the bulletin board text data at step M13 or step C13 and displays the bulletin board text data at step M14 or step C14. At the display of the bulletin board text data, the bulletin board text data is displayed in accordance with the display capabilities of the respective display units 13 and 13' of the electronic musical apparatuses M1 and M2.

As is evident from the above descriptions, when the electronic musical apparatus M1 and M2 retrieve bulletin board text data from the server computer SC, the electronic musical apparatus M1 and M2 are not required to enter information that identifies a bulletin board, being allowed to access the server computer SC to receive bulletin board text data quite easily. The server computer SC retrieves apparatus ID information of the electronic musical apparatus M1 or electronic musical apparatus M2 that is currently accessing the server computer SC to identify the model of the electronic musical apparatus M1 or M2. As a result, the server computer SC is capable of delivering appropriate bulletin board text data to the electronic musical apparatus M1 or M2. Therefore, the users of the electronic musical apparatuses M1 and M2 are capable of retrieving bulletin board text data without entering, for example, information that identifies a bulletin board. Consequently, the users can retrieve bulletin board text data quite easily even with the apparatuses such as the electronic musical apparatuses M1 and M2 that are not provided with separate input means (e.g., a keyboard and mouse). Furthermore, the apparatus ID is retrieved by a general site other than a dedicated site, and will not be transmitted to any site other than a specific domain (dedicated site) in order to prevent the apparatus ID from being stored in associated relation with personal information such as username. Therefore, it is preferable to place restrictions on the electronic musical apparatuses M1 and M2 such as refraining from transmitting an apparatus ID in a case where the security of routes is not ensured by the SSL (Secure Socket Layer), etc.

In the above-described first embodiment and second embodiment, the present invention has been explained with examples of the electronic musical apparatuses M1 and M2 having a form of an electronic musical instrument that is provided with the keyboard 11 as performance operators, however, the present invention can be applied to electronic musical apparatuses having various different forms of electronic musical instrument provided with a touch plate, push-buttons, strings, etc. as performance operators as far as such electronic musical instruments have a display unit and are capable of communicating with an external apparatus. Furthermore, the present invention may be widely applied to even electronic musical apparatuses such as a sequencer (an automatic performance apparatus), tone generator, mixer, effector and recorder, and computer apparatuses that do not have a form of an electronic musical instrument provided with performance operators but can generate musical tone signals and communicate with an external apparatus to retrieve various information on condition that those apparatuses have a display unit.

In carrying out the present invention, furthermore, it will be understood that the present invention is not limited to the above-described first embodiment and second embodiment, but various modifications may be made without departing from the spirit and scope of the invention.

What is claimed is:

1. A server computer which is connected to a network and delivers an e-mail message to an external terminal apparatus connected to the network, the server computer comprising:

a first database storing identification information for identifying the external terminal apparatus and user information for identifying a user of the external terminal apparatus with associated relation established between the identification information and the user information;

a second database storing an e-mail message of the user of the external terminal apparatus identified on the basis of the user information;

a receiving portion for receiving identification information from the external terminal apparatus;

a user identifying portion for searching the first database on the basis of the identification information received by the receiving portion and identifying the user of the external terminal apparatus;

an e-mail message extracting portion for searching the second database on the basis of the user identified by the user identifying portion and extracting an e-mail message to be delivered to the external terminal apparatus;

an e-mail message delivering portion for delivering the e-mail message extracted by the e-mail message extracting portion to the external terminal apparatus;

a first determining portion for determining whether the server computer has received the identification information from the external terminal apparatus;

a second determining portion for determining that the external terminal apparatus is an electronic music instrument without any input means dedicated for inputting a character or a general-purpose device with input means for inputting a character;

a requesting portion for issuing a request for the user information to the external terminal apparatus; and a second receiving portion for receiving the user information from the external terminal apparatus;

wherein when the first determining portion determines that the identification information has been received, the second determining portion determines that the external terminal apparatus is an electronic music instrument without any input means dedicated for inputting a character, the user identifying portion accesses the first database to obtain user information associated with the identification information, and the email message extracting portion searches the second database on the basis of the obtained user information to extract an email message to be delivered to the electronic music instrument, and wherein when the first determining portion determines that the identification information has not been received, the second determining portion determines that the external terminal apparatus is a general-purpose device with input means for inputting a character, the requesting portion issues a request for user information to the general-purpose device, and the email message extracting portion searches the second database on the basis of the user information received from the general-purpose device to extract an email message to be delivered to the general-purpose device.

2. The server computer according to claim 1 wherein the external terminal apparatus is an electronic musical apparatus which generates a musical tone signal.

3. The server computer according to claim 1 wherein the e-mail message is adjusted on the basis of display capability of a display unit incorporated in the external terminal apparatus.

4. The sever computer according to claim 1 wherein the identification information is a production number of the external terminal apparatus or an identification number of the external terminal apparatus given to a user after the purchase of the external terminal apparatus.

5. A server computer which is connected to a network and delivers electronic bulletin board information stored in an electronic bulletin board to an external terminal apparatus connected to the network, the server computer comprising:

a first database storing identification information for identifying the external terminal apparatus and model information for identifying a model of the external terminal apparatus with associated relation established between the identification information and the model information;

a second database storing electronic bulletin board information being constituted by a plurality of categories associated with the model of the external terminal apparatus identified by use of the model information;

a receiving portion for receiving identification information from the external terminal apparatus;

a model identifying portion for searching the first database on the basis of the identification information received by the receiving portion and identifying a model of the external terminal apparatus;

an information extracting portion for extracting from the second database, on the basis of the model identified by the model identifying portion, electronic bulletin board information of a category associated with the identified model;

an information delivering portion for delivering the electronic bulletin board information extracted by the information extracting portion to the external terminal apparatus;

a first determining portion for determining whether the server computer has received the identification information from the external terminal apparatus;

a second determining portion for determining that the external terminal apparatus is an electronic music instrument without any input means dedicated for inputting a character or a general-purpose device with input means for inputting a character;

a requesting portion for issuing a request for the model information or category information for identifying a category of an electronic bulletin board to the external terminal apparatus; and a second receiving portion for receiving the model information or the category information from the external terminal apparatus;

wherein when the first determining portion determines that the identification information has been received, the second determining portion determines that the external terminal apparatus is an electronic music instrument without any input means dedicated for inputting a character, the model identifying portion accesses the first database to obtain model information associated with the identification information, and the information extracting portion searches the second database on the basis of the obtained model information to extract an electronic bulletin board information to be delivered to the electronic music instrument, and wherein when the first determining portion determines that the identification information has not been received, the second determining portion determines that the external terminal apparatus is a general-purpose device with input means for inputting a character, the requesting portion issues a request for model information to the general-purpose device, and the information extraction portion searches the second database on the basis of the model information received from the general-purpose device to extract an electronic bulletin board information to be delivered to the general-purpose device.

6. The server computer according to claim 5 wherein the external terminal apparatus is an electronic musical apparatus which generates a musical tone signal.

7. The server computer according to claim 5 wherein the electronic bulletin board information is adjusted on the basis of display capability of a display unit incorporated in the external terminal apparatus.

8. The server computer according to claim 5 wherein the identification information is a production number of the external terminal apparatus or an identification number of the external terminal apparatus given to a user after the purchase of the external terminal apparatus.

9. A method which is applied to a server computer connected to a network and delivering an e-mail message to an external terminal apparatus connected to the network, the method including the steps of:

receiving, from the external terminal apparatus, identification information for identifying the terminal apparatus;

searching, on the basis of the received identification information, a first database which stores the identification information and user information for identifying a user of the external terminal apparatus with associated relation established between the identification information and user information, and identifying the user of the external terminal apparatus;

searching, on the basis the identified user, a second database which stores an e-mail message for the user of the external terminal apparatus and extracting an e-mail message to be delivered to the external terminal apparatus;

delivering the extracted e-mail message to the external terminal apparatus;

determining whether the server computer has received the identification information from the external terminal apparatus;

determining that the external terminal apparatus is an electronic music instrument without any input means dedicated for inputting a character or a general-purpose device with input means for inputting a character;

issuing a request for the user information to the external terminal apparatus;

receiving the user information from the external terminal apparatus;

when it is determined that the identification information has been received and that the external terminal apparatus is an electronic music instrument without any input means dedicated for inputting a character, accessing the first database to obtain user information associated with the identification information, and searching the second database on the basis of the obtained user information to extract an email message to be delivered to the electronic music instrument, and when it is determined that the identification information has not been received and that the external terminal apparatus is a general-purpose device with input means for inputting a character, issuing a request for user information to the general-purpose device, and searching the second database on the basis of the user information received from the general-purpose device to extract an email message to be delivered to the general-purpose device.

10. The method according to claim 9 wherein the identification information is a production number of the external terminal apparatus or an identification number of the external terminal apparatus given to a user after the purchase of the external terminal apparatus.

11. A method which is applied to a server computer connected to a network and delivering electronic bulletin board information stored in an electronic bulletin board to an external terminal apparatus connected to the network, the method including the steps of:

receiving, from the external terminal apparatus, identification information for identifying the terminal apparatus;

searching, on the basis of the received identification information, a first database which stores the identification information and model information representative of the model of the external terminal apparatus with associated relation established between the identification information and the model information, and identifying the model of the external terminal apparatus;

extracting, on the basis of the identified model, electronic bulletin board information of a category associated with the identified model from a second database which stores electronic bulletin board information being constituted by a plurality of categories associated with the model of the external terminal apparatus;

delivering the extracted electronic bulletin board information to the external terminal apparatus;

determining whether the server computer has received the identification information from the external terminal apparatus;

determining that the external terminal apparatus is an electronic music instrument without any input means dedicated for inputting a character or a general-purpose device with input means for inputting a character;

issuing a request for the user information to the external terminal apparatus;

receiving the user information from the external terminal apparatus;

when it is determined that the identification information has been received and that the external terminal apparatus is an electronic music instrument without any input means dedicated for inputting a character, accessing the first database to obtain model information associated with the identification information, and searching the second database on the basis of the obtained model information to extract an electronic bulletin board information to be delivered to the electronic music instrument, and when it is determined that the identification information has not been received and that the external terminal apparatus is a general-purpose device with input means for inputting a character, issuing a request for model information to the general-purpose device, and searching the second database on the basis of the model information received from the general-purpose device to extract an electronic bulletin board information to be delivered to the general-purpose device.

12. The method according to claim 11 wherein the identification information is a production number of the external terminal apparatus or an identification number of the external terminal apparatus given to a user after the purchase of the external terminal apparatus.

\* \* \* \* \*